May 20, 1941.                W. L. McGRATH                2,242,588
                              HEATING SYSTEM
                            Filed Feb. 7, 1938              3 Sheets-Sheet 1

INVENTOR
William L. McGrath
BY
George H. Fisher
ATTORNEY

May 20, 1941.　　　W. L. McGRATH　　　2,242,588
HEATING SYSTEM
Filed Feb. 7, 1938　　　3 Sheets-Sheet 2

INVENTOR
William L. McGrath
BY
George H Fisher
ATTORNEY

May 20, 1941.   W. L. McGRATH   2,242,588
HEATING SYSTEM
Filed Feb. 7, 1938   3 Sheets-Sheet 3

INVENTOR
William L. McGrath
BY
George H Fisher
ATTORNEY

Patented May 20, 1941

2,242,588

UNITED STATES PATENT OFFICE 2,242,588

HEATING SYSTEM

William L. McGrath, St. Paul, Minn., assignor to Minneapolis-Honeywell Regulator Company, Minneapolis, Minn., a corporation of Delaware Application February 7, 1938, Serial No. 189,028

21 Claims. (Cl. 237—2)

This invention relates to heating systems and more particularly to heating systems using a reverse cycle mechanical refrigerating apparatus.

An object of this invention is to utilize a novel arrangement incorporating a plurality of heat pumps for heating a space or building.

A further object of this invention is to provide in combination with a reverse cycle heating system a means which will insure that the system will operate properly to absorb heat and liberate it to the space to be heated, i. e., to insure that the system will not reverse during operation.

Another object of this invention is to provide a mechanical reverse cycle heating system wherein the compressor is operated by a heat engine and wherein the waste heat of the heat engine is also utilized for heating purposes.

Still another object of this invention is to provide control systems for reverse cycle heating systems for automatically controlling the same in new and improved manners.

Further objects of this invention reside in improvements in the construction of and method of operating a refrigerating apparatus generally and especially where the refrigerating apparatus is utilized for heating purposes.

Figure 1:
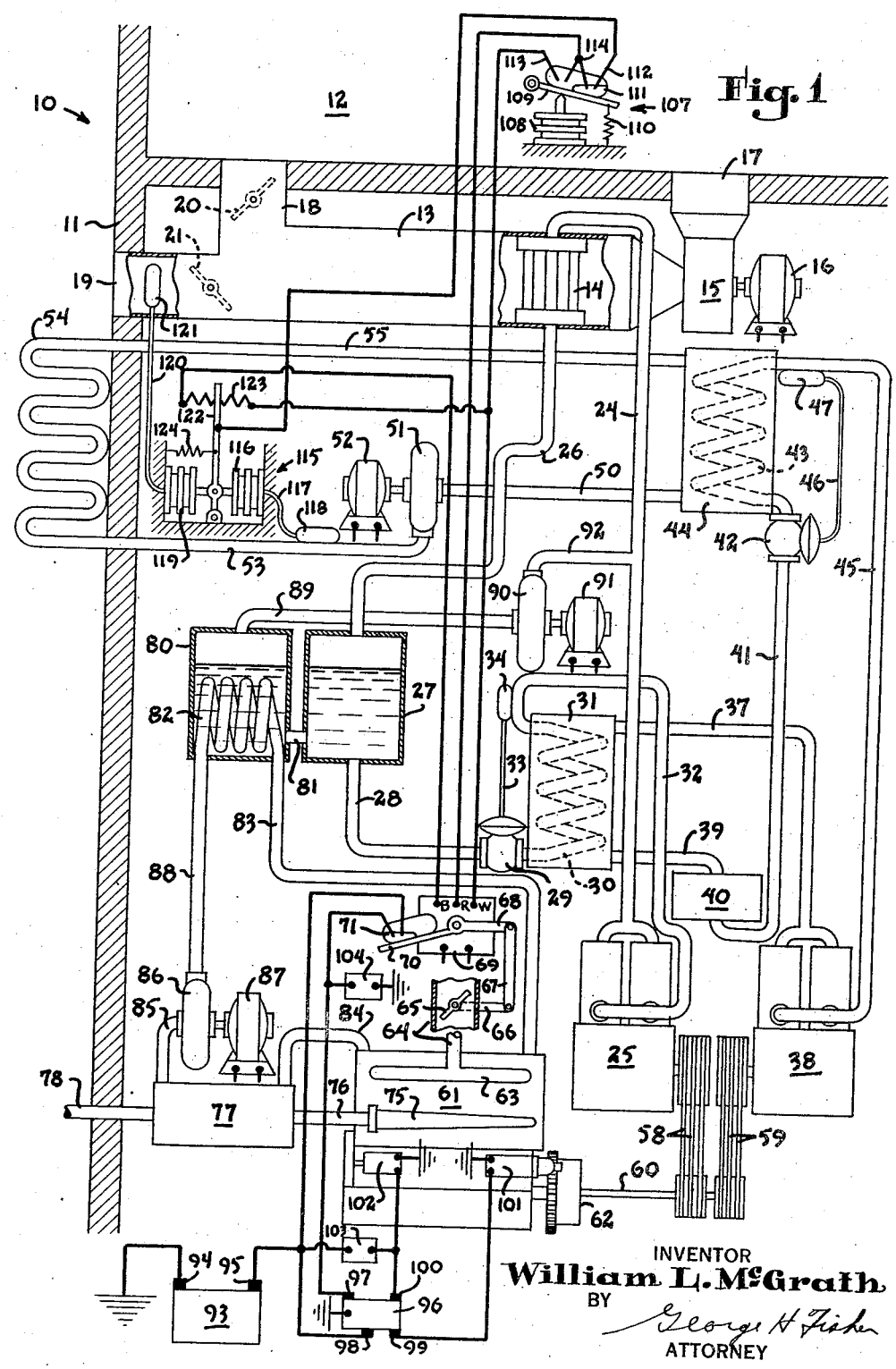
Figure 2:
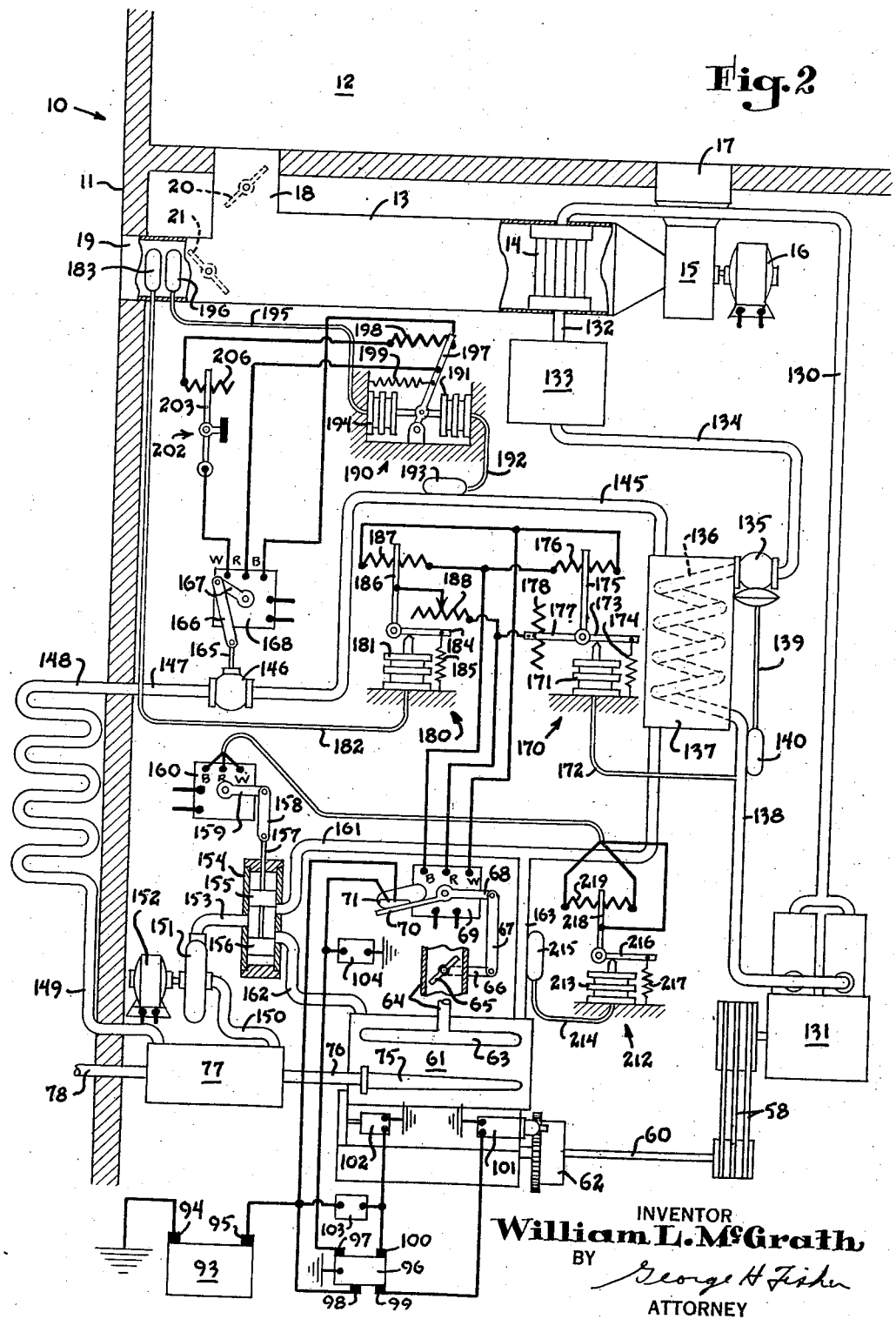
Figure 3:
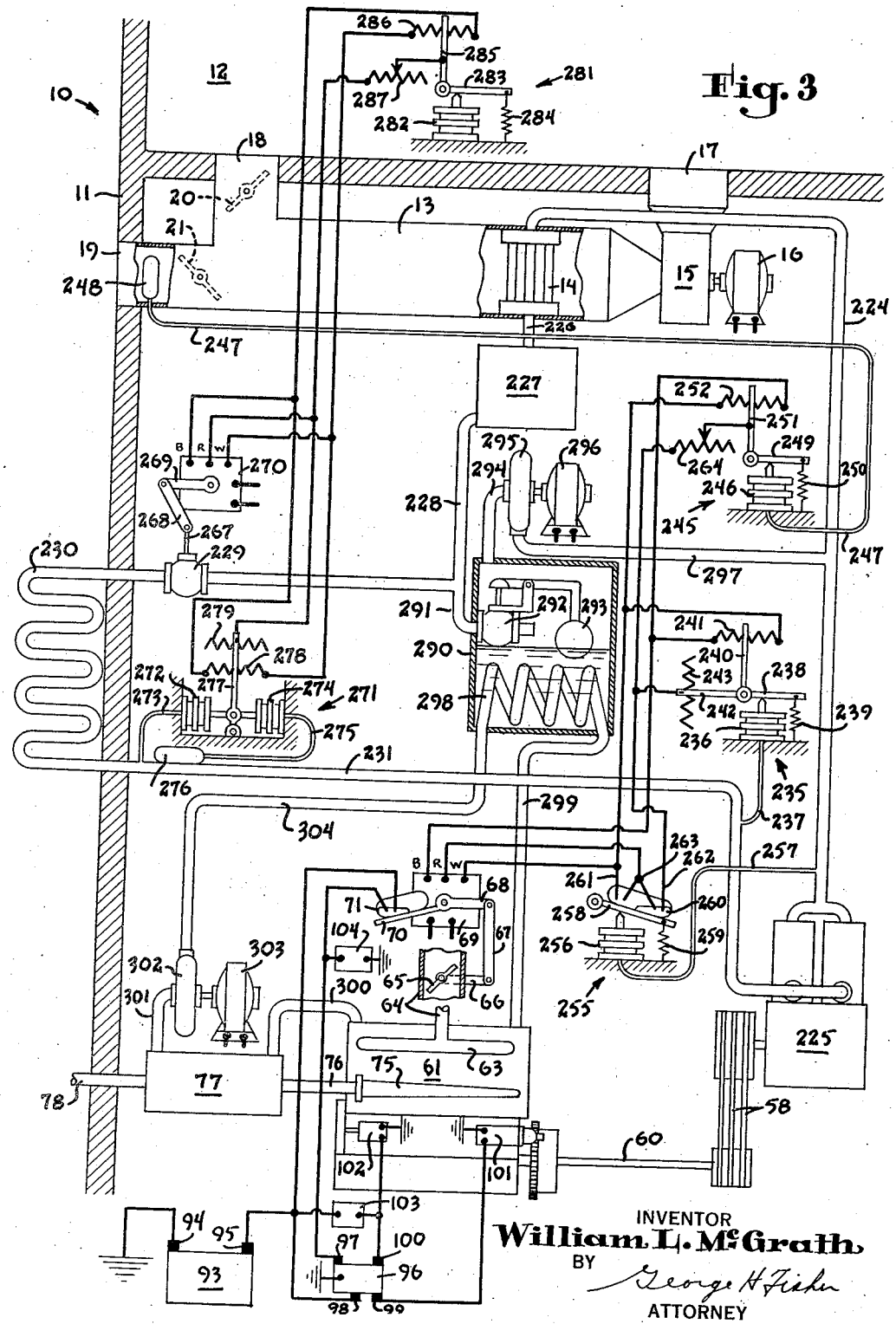

Other objects and advantages will become apparent to those skilled in the art upon reference to the accompanying specification, claims, and drawings, in which Figures 1, 2, and 3 illustrate diagrammatically several forms which the invention may take.

Referring now to Figure 1, a building to be heated is generally designated at 10 and is shown to comprise an outside wall 11 and a space to be heated 12. A heating chamber 13 having a heating coil 14 is utilized for heating the space 12. A fan 15 operated by a motor 16 circulates heated air from the heating chamber 13 through a discharge duct 17 into the space 12 and through a return air duct 18 into the heating chamber 13. A duct 19 is provided for supplying outside or fresh air to be mixed with return or recirculated air in the heating chamber 13. Dampers 20 and 21 in the return air duct 18 and the fresh air duct 19 are utilized for proportioning the amount of fresh and return air delivered to the heating chamber 13.

The heating coil 14 in this instance is formed by a condenser of a mechanical refrigerating apparatus, it being connected by a pipe 24 to the high pressure side of a compressor 25 and by a pipe 26 to a receiver 27. The receiver 27 is connected by a pipe 28 through an expansion valve 29 to an evaporator coil 30 forming a part of a heat exchanger 31. The evaporator coil 30 is in turn connected by a pipe 32 to the low pressure side of the compressor 25. The expansion valve 29 is shown for purposes of illustration to be a thermostatic expansion valve having a capillary tube 33 and a bulb 34 containing a volatile fluid and responsive to the temperature of the refrigerant on the discharge side of the evaporator coil 30. When the compressor 25 is operated, refrigerant is compressed thereby and delivered through the pipe 24 into the condenser 14 where the refrigerant is condensed liberating heat. The condensed refrigerant then flows through the pipe 26 into the receiver 27 where it is conveyed by the pipe 28 through the expansion valve 29 into the evaporator 30 where it is gasified and absorbs heat. The gaseous refrigerant is taken from the compressor through the pipe 32 by a compressor 25.

The heat exchanger 31 which has as a component part thereof, the evaporator 30 of the above referred to refrigerating system, acts also as a condenser of a second refrigerating system. This condenser is connected by a pipe 37 to the high pressure side of a second compressor 38 and by a pipe 39 to a receiver 40. The receiver 40 is in turn connected by a pipe 41 to an expansion valve 42 which in turn is connected to an evaporator coil 43 forming a component part of a second heat exchanger 44. The evaporator 43 is also connected by a suction line 45 to the low pressure side of the compressor 38. The expansion valve 42 is shown for purpose of illustration to comprise a thermostatic expansion valve having a capillary tube 46 and a bulb 47 containing a volatile fluid and located on the low pressure side of the evaporator 43. Upon operation of the compressor 38 the refrigerant of this second refrigerating system is compressed and delivered to the heat exchanger 31 wherein it is liquified liberating its heat to the evaporator 30 of the first refrigerating system. The condensed refrigerant passes through the pipe 39 to the receiver 40 and from there through the expansion valve 42 into the evaporator 43 where it is vaporized absorbing heat. The vaporized refrigerant is drawn from the evaporator 43 through the pipe 45 by the compressor 38.

A fluid, such as brine, is circulated through the heat exchanger 44 for giving up its heat to the evaporator 43 of the second refrigerating system. The brine is taken from the heat exchanger 44 through a pipe 50 by a pump 51 driven by a motor 52 and discharged through a pipe 53 into a coil 54 located outside of the building. The coil 54 is in turn connected by a pipe 55 to the heat exchanger 44.

The parts thus far described are so arranged that the brine solution picks up heat from the outside air in the coil 54 and liberates this heat in the heat exchanger 44 to the evaporator 43 of the second refrigerating system. The heat absorbed by the evaporator 43 of this second refrigerating system is liberated in the heat exchanger 31 to evaporator 30 of the first refrigerating system. In turn the heat absorbed by the evaporator 30 of the first refrigerating system is liberated in the condenser 14 forming the heating coil for the space to be heated. From the above it is seen that a plurality of heat pumps are utilized to form in effect a multiple heat pump or binary refrigerating system to pump heat from the outside of the building to the space 12. By reason of this binary refrigeration or multiple heat pump system desired temperatures may be more readily maintained in the space 12 at lower outside temperatures and therefore this binary system as described above forms a salient feature of this invention.

The two compressors 25 and 38 may be driven through belts 58 and 59, respectively, by a shaft 60 operated by a heat motor 61 which for purposes of illustration is shown to be an internal combustion engine. The internal combustion engine is also provided with the usual fly wheel 62 and may be provided with a clutch arrangement (not shown) between the shaft 60 and the engine 61. The engine 61 is provided with an intake manifold 63 which is connected to an intake pipe 64. The flow of fuel through the pipe 64 into the manifold 63 and hence the speed of the internal combustion engine 61 is controlled by a butterfly valve 65 which may be connected through a crank arm 66, link 67 and a crank arm 68 to a proportioning motor 69 which may be of the type shown and described in Patent No. 2,028,110 granted to D. G. Taylor on January 14, 1936. This proportioning motor may also operate a lever 70 which in turn operates a mercury switch 71 which acts as the ignition switch for the internal combustion engine 61. The internal combustion engine 61 is also provided with an exhaust manifold 75 which is connected by an exhaust pipe 76 to a heat exchanger 77. Exhaust gases may be conveyed from the heat exchanger 77 by a pipe 78 to the outside atmosphere.

A boiler 80 shown to be located adjacent the receiver 27 of the first refrigerating system is connected thereto by a pipe 81 so that the level of the liquid refrigerant in the boiler 80 and the receiver 27 is substantially the same. The boiler 80 contains a heating coil 82 through which flows a heating fluid for heating and vaporizing the refrigerant in the boiler 80. The heating fluid passes from the coil 82 through a pipe 83 into the cooling jacket of the internal combustion engine 61 and from there through a pipe 84 to the heat exchanger 77. From the heat exchanger 77 the heating fluid passes through a pipe 85, a pump 86 driven by a motor 87 and a pipe 88 back to the coil 82. Upon operation of the pump 86 the heating fluid is circulated in the path outlined above and absorbs heat from the cooling jacket of the internal combustion engine and from the exhaust gases of the internal combustion engine. This heat thus absorbed is usually waste heat but in accordance with the principles of this invention this absorbed waste heat is liberated in the boiler 80 to heat and vaporize the refrigerant therein. This heated and vaporized refrigerant passes from the boiler 80 through a pipe 89, a pump 90 operated by a motor 91 and a pipe 92 into the high pressure line 94 leading into the condenser 14. This heated gasified refrigerant is condensed in the condenser 14 liberating its heat for heating the space 12. In other words the waste heat of the internal combustion engine is inserted in the first refrigerating system for liberating this waste heat in the condenser or main heating coil 14 for additionally heating the space 12. By utilizing the waste heat of the internal combustion engine and inserting this waste heat into the reverse cycle heating system, greater efficiency of the heating system as a whole is obtained and hence this forms another salient feature of this invention.

The internal combustion engine 61 is provided with an automatic starting system which may be the "Startex" system illustrated in Patent No. 1,773,913, granted to L. H. Loehr, et al. on August 26, 1930. This system may include a storage battery 93 having negative ground terminal 94 and a positive terminal 95. A relay 96 is provided with a pull-in coil connected from terminal 97 to the ground, the pull-in coil operating a load switch connected across terminals 98 and 99. The relay is also provided with a bucking coil connected between terminal 100 and the ground. The arrangement of the relay is such that when the pull-in coil 97 is energized the load switch is closed to complete a circuit across terminals 98 and 99 and when the bucking coil is energized it counteracts the action of the pull-in coil to open the load switch and break the circuit across the terminals 98 and 99. A starter motor is designated at 101 for starting the internal combustion engine when energized and a generator 102 is used for energizing the pull-in coil after the engine has been placed in operation. A cut-out 103 is also provided as well as an ignition coil 104. When the mercury switch 71 is closed a circuit is completed from the positive terminal 95 of the battery 93 through the switch 71 to energize the ignition coil 104 and to the terminal 97 of the relay 96 to energize the pull-in coil to complete a circuit across the terminals 98 and 99. The starter 101 is then placed in operation to start the internal combustion engine 61 and when the internal combustion engine has been placed in operation the generator 102 builds up a current which is transmitted through the terminal 100 to the bucking coil of the relay 96 whereupon the load switch therein is opened to stop operation of the starter motor 101. A cut-out 103 is provided for preventing discharging of the battery 93 through the generator 102. From the above it is seen that whenever the switch 71, which is the ignition switch, is closed, the internal combustion engine 61 is placed in operation and when this switch 71 is opened the internal combustion engine is stopped.

The proportioning motor 69 which controls the starting and stopping and the speed of operation of the internal combustion engine 61 is controlled by a space thermostat generally designated at 107. This space thermostat may comprise a bellows 108 which contains a volatile fluid for operating a pivoted lever 109 against the action of a spring 110. The lever 109 in turn operates a mercury switch 111 having end electrodes 112 and 113 and common electrodes 114. When the space temperature is above the desired value, say 70°, the bellows 108 expands against the action of the spring 110 to cause the mercury to bridge electrodes 113 and 114 and when the space temperature is below the desired value the bellows 108 contracts to cause the mercury 111 to bridge the electrodes 112 and 114. By suitably varying the tension of the spring 110 the temperature setting of the thermostat 107 may be adjusted. As shown in Figure 1 the temperature of the space 12 is below the desired normal value.

A differential temperature controller is generally designated at 115 and may comprise a bellows 116 connected by a capillary tube 117 to a bulb 118 responding to the temperature of the brine entering the outdoor coil 54 and bellows 119 connected by a capillary tube 120 to a bulb 121 responding to outdoor temperatures. These two bellows 116 and 119 operate against each other for moving a pivoted lever 122 across a resistance element 123. A spring 124 assists the biasing action of the bellows 116 so that the temperature of the outside coil must be higher than the temperature of the brine going to the coil 54 to maintain the slider 122 in the mid position with respect to the resistance element 123. As the outdoor temperature decreases or as the brine temperature increases the slider 122 is moved toward the left with respect to the resistance element 123 and conversely if the outdoor temperature increases or if the brine temperature decreases slider 122 is moved to the right with respect to the resistance element 123. It follows then that the slider 122 is positioned in accordance with the difference in temperature between the outside temperature and the brine temperature. When the temperature differential decreases the slider moves to the left and when this temperature differential increases the slider moves to the right. This differential temperature controller 115 operates to position the proportioning motor 69 and hence to vary the speed of the combustion engine 61 to maintain a substantially constant temperature differential between the outdoor temperature and the temperature of the brine entering the coil 54 for a purpose to be more fully explained hereafter.

Upon reference to the above referred to Taylor patent it will be seen that the proportioning motor 69 includes a pair of series connected relay coils for controlling the direction of operation thereof and a balancing potentiometer or mechanical follow-up means for controlling the extent of movement thereof. The ends of these series connected coils are connected to the terminals B and W of the proportioning motor 69 and the junction of these coils is connected to the terminal R. When the external resistance connected across the terminals W and R is decreased the proportioning motor 69 is operated to move the throttle valve 65 toward a closed position to decrease the speed of the internal combustion engine 61 and when the external resistance across the terminals B and R is decreased the proportioning motor 69 is operated in the opposite direction to open the throttle valve 65 and hence increase the speed of the internal combustion engine.

The terminal R of the proportioning motor is connected to the common electrode 114 of the room thermostat and if the room thermostat is satisfied the mercury bridges electrodes 113 and 114 to substantially short-circuit the terminals R and W whereupon the proportioning motor 69 is moved to an extreme position to close the throttle valve 65 and open the ignition switch 71. Hence under these conditions the internal combustion engine is stopped and there is no delivery of heat to the space. Upon a call for heat by the space thermostat 107 the switch 111 is moved to the position shown in Figure 1 and the mercury bridges electrodes 112 and 114 to connect the terminal R of the proportioning motor to the slider 122 of the differential temperature controller 115. It is seen that the ends of the resistance element 123 of the differential temperature controller are connected across the terminals B and W of the proportioning motor 69 and hence the proportioning motor 69 will assume a position according to the position of the slider 122.

With the slider in the position shown in Figure 1 the proportioning motor 69 will be moved to the mid position to close the switch 71 to start the internal combustion engine and will move the butterfly valve 65 to the mid position to cause the internal combustion engine to operate at a predetermined speed. If now the temperature differential between the outside temperature and th temperature of the brine entering the coil 54 should decrease indicating that as much heat cannot be picked up from the outside atmosphere by the coil 54, the slider 122 of the differential temperature controller 115 will move to the left with respect to the resistance element 123. This decreases the external resistance across the terminals B and R of the proportioning motor 69 and increases the resistance across the terminals R and W to operate the proportioning motor 69 in a direction to open wider the butterfly valve 65. This in turn increases the speed of the internal combustion engine 61 and hence the speed of the compressors 25 and 38. As the compressor speeds are increased more absorption of heat takes place at the evaporators and more liberation of heat takes place at the condensers. Hence more heat is given off by the system and the temperature of the brine being delivered through the pipe 53 to the outdoor coil 54 is decreased. In other words, if the temperature differential between the outside temperature and the temperature of the brine decreases the speed of the compressors 25 and 38 is increased to decrease the temperature of the brine and therefore maintain substantially constant the differential in temperature between the outside temperature and the brine temperature.

If on the other hand the temperature differential between the outside temperature and the brine temperature should increase, the slider 122 of the differential temperature controller is moved to the right to decrease the external resistance across the terminals R and W of the proportioning motor 69 and increase the external resistance across the terminals B and R. This causes opposite movement of the proportioning motor 69 and consequent closing movement of the butterfly valve 65 to decrease the speed of the internal combustion engine 61 and hence the speed of the compressors 25 and 38. Less heat is therefore picked up from the brine and the brine temperature is allowed to increase to maintain substantially constant the differential in temperature between the outside temperature and the brine temperature.

Summarizing briefly the operation of Figure 1, when the space temperature is satisfied the internal combustion engine 61 and the compressors 25 and 38 are stopped and no heat is supplied to the space 12. Upon a call for heat by the space thermostat 107 the internal combustion engine 61 is placed under the control of the differential controller to maintain substantially constant the temperature differential between the outside temperature and the temperature of the brine flowing to the outside coil 54 which insures that heat will at all times be absorbed by the outside coil 54. In other words, the differential temperature controller 115 acts upon a call for heat by the space thermostat 107 to maintain substantially constant the amount of heat absorbed by the outdoor coil 54 and hence insures that heat will at all times be picked up thereby and will not reverse itself during the operation of the system. In addition, as pointed out above, provision is made in Figure 1 for utilizing the waste heat of the internal combustion engine for heating purposes, this being accomplished by the auxiliary boiler 80 which dissipates this heat into the main heating coil or condenser 14. The binary or multiple heat system of Figure 1 insures that heat may be supplied to the space 10 even though the outside temperature is decreased to extremely low values.

Referring now to Figure 2 there is illustrated the same building and space and the same heating chamber therefor and hence like reference characters have been utilized. In Figure 2 the main heating coil or condenser 14 is connected by a high pressure pipe 130 to the high pressure side of a compressor 131 and is connected by a pipe 132 to a receiver 133. The receiver 133 is in turn connected by a pipe 134 through an expansion valve 135 into an evaporator coil 136 forming a component part of a heat exchanger 137. The low pressure side of the evaporator 136 is connected by a pipe 138 to the suction side of the compressor 131. For purposes of illustration the expansion valve 135 is shown to be a thermostatic expansion valve having a capillary tube 139 connected to a bulb 140 containing a volatile fluid and located on the discharge side of the evaporator coil 136. When the compressor is operated heat is absorbed by the evaporator coil 136 in the heat exchanger 137 and is liberated in the condenser or main heating coil 14 for heating the space 12.

The compressor 131 is operated by an internal combustion engine in exactly the same manner as in Figure 1 and hence like reference characters for the internal combustion engine and its component parts are utilized in Figure 2. The speed of the internal combustion engine 61 in Figure 2 is controlled by a proportioning motor 69 as in Figure 1 and also the starting of the internal combustion engine is controlled by a "Startex" system as in Figure 1.

A circulating system supplies heat to the evaporator 136 in the heat exchanger 137 and is shown to comprise a pipe 145 connected to the heat exchanger 137 and extending to a flow regulating valve 146. The flow regulating valve 146 is connected by a pipe 147 to an outdoor coil 148 which in turn is connected by a pipe 149 into the exhaust gas heat exchanger 77. The exhaust gas heat exchanger 77 is connected through a pipe 150, a pump 151 operated by a motor 152 and a pipe 153 into a three-way mixing valve 154. The three-way mixing valve is provided with two valve heads 155 and 156 connected by a valve stem 157, a pitman 158 and a crank arm 159 to a proportioning motor 160 which may also be of the type shown and described in the above referred to Taylor patent. One outlet of the three-way mixing valve 154 is connected by a pipe 161 to the heat exchanger 137 and the outer outlet is connected by a pipe 162 into the cooling jacket of the internal combustion engine 61. The cooling jacket is in turn connected by pipes 163 and 161 to the heat exchanger 137. When the pump 151 is operated the circulating fluid which liberates its heat in the heat exchanger 137 flows from the heat exchanger 137 through the flow regulating valve 146, the outdoor coil 148, the exhaust gas heat exchanger 77, the three-way mixing valve 154 and either directly back to the heat exchanger 137 or through the cooling jacket of the internal combustion engine 161 to the heat exchanger 137 depending upon the position of the three-way mixing valve 154. The flow regulating valve 146 is operated through a valve stem 165, a pitman 166, and a crank arm 167 by a proportioning motor 168 which may also be of the type shown and described in the above referred to Taylor patent.

The proportioning motor 69 which controls the speed of the internal combustion engine 61 and hence the speed of the compressor 131 is controlled by a suction or low pressure controller generally designated at 170. This controller may comprise a bellows 171 connected by a pipe 172 into the low pressure line 138 of the refrigerating system. The bellows 171 operates a lever 173 against the action of a tension spring 174. The lever 173 operates a slider 175 with respect to a potentiometer resistance element 176 and also a slider 177 with respect to a center tapped resistance element 178. Upon an increase in suction pressure the bellows 171 expands to move the slider 175 to the left with respect to its potentiometer resistance element 166 and to move the slider 177 downwardly with respect to its center tapped resistance element 178. Conversely upon a decrease in suction pressure the slider 175 is moved to the right and the slider 177 is moved upwardly.

The control of the proportioning motor 69 by the suction pressure controller 170 is compensated by an outdoor temperature controller or compensator generally designated at 180. This outdoor temperature controller or compensator 180 may comprise a bellows 181 connected by a capillary tube 182 to a bulb 183 which may be located in the fresh air duct 19 so as to be responsive to outdoor temperatures. The bulb 183, the capillary tube 182, and the bellows 181 preferably contains a volatile fluid which upon an increase in outdoor temperature expands the bellows 181 to operate a lever 184 against the action of a spring 185 which moves a slider 186 to the left with respect to a potentiometer resistance element 187. Conversely upon a decrease in outdoor temperature the bellows 181 contracts to move the slider 186 to the right with respect to the potentiometer resistance element 187.

The common terminal R of the proportioning motor 69 is connected to the slider 175 of the controller 170 through the center tapped resistance 178 and the slider 177 and is also connected through a variable resistance 188 to the slider 186 of the compensator 180. The ends of the potentiometer resistance elements 176 and 187 are connected to the terminals B and W of the proportioning motor 69. From the above it is seen that the two potentiometers of the controller 170 and the compensator 180 are connected in parallel with respect to each other and across the proportioning motor terminals B, R, and W.

With the controllers 170 and 180 in the positions shown in Figure 2 the butterfly valve 65 is in a mid position and the internal combustion engine 61 and the compressor 131 are operating at a predetermined speed. If now the suction pressure in the pipe 138 should increase, the slider 175 will be moved toward the left with respect to its resistance element 176. This decreases the external resistance across the motor terminals B and R and increases the external resistance across the terminals R and W to cause the proportioning motor 69 to move in a direction to open the butterfly valve 65 and hence increase the speed of the internal combustion engine 61 and the speed of the compressor 131. Upon a decrease in the suction pressure, the slider 175 is moved toward the right to decrease the external resistance across the terminals R and W and increase the external resistance across the terminals B and R. This causes opposite movement of the proportioning motor 69 to close the butterfly valve 65, to decrease the speed of the internal combustion engine and hence decrease the speed of the compressor 131. By reason of the above arrangement the speed of the internal combustion engine 61 and hence the speed of the compressor 131 is controlled to maintain the suction pressure substantially constant and hence maintain the heating effect of the condenser or coil 14 substantially constant.

If now the outdoor temperature should decrease, which means that more heat must be supplied to the space 12, the slider 186 of the compensator 180 is moved toward the right with respect to its resistance element 187 which decreases the external resistance across the terminals B and R and increases the external resistance across the terminals R and W of the proportioning motor 69. Accordingly the butterfly valve 65 is moved toward open position to increase the speed of internal combustion engine 61 and the speed of the compressor 131. Conversely upon an increase in outdoor temperature the slider 186 of the compensator 180 is moved toward the left to decrease the external resistance across the terminals R and W and increase the external resistance across the terminals B and R. This causes closing movement of the butterfly valve 65 and decreases the speed of the internal combustion engine 61 and decreases the speed of the compressor 131. By reason of the above arrangement the compensator 180 acts to reset or adjust the control point of the suction pressure controller 170 in accordance with variations in outside temperature so that as the outside temperature decreases the suction pressure control point is decreased to increase the amount of heat given off by the condenser 14. Likewise as the outside temperature increases the control point of the suction pressure controller 170 is raised to decrease the amount of heat given off by the condenser 14. Accordingly the amount of heat supplied to the space 12 is adjusted in accordance with outside temperatures to make up for the heat loss from the space caused by variations in outside temperatures. Therefore substantially constant space temperatures are maintained without the use of a space thermostat and regardless of variations in outside temperature. While no space thermostat has been illustrated, it should be understood that a thermostat responsive to the temperature of the space 12 may be suitably connected in the system to insure the maintenance of a desired space temperature as in Figures 1 and 3. In addition the outdoor compensator 180, which adjusts the suction pressure controller 170 to raise the suction pressure as the outdoor temperature increases, causes the system to operate at its highest efficiency. In other words, by allowing the suction pressure to increase as the outside temperature increases the compressor 131 does not have to operate as hard as if the suction pressure were maintained at a constant value. Further, the control of the compressor by the suction pressure controller 170 and the outdoor compensator 180 tends to maintain at all times a constant temperature differential between the outside temperature and the temperature of the outdoor coil 148 whereby heat will always be absorbed by the outdoor coil.

If for some reason or other the coil temperature should increase to that of the outside temperature, provision is made for throttling the flow of the circulating fluid through the outdoor coil 148 whereby the coil temperature is decreased. This is accomplished by the flow regulating valve 146 which is adjusted by the proportioning motor 168. The proportioning motor 168 in this instance is controlled by a differential controller generally designated at 190. This controller may comprise a bellows 191 connected by a capillary tube 192 to a bulb 193 responding to the temperature of the circulating fluid going to the coil 148 and a bellows 194 connected by a capillary tube 195 to a bulb 196 responsive to changes in outside temperature. The two bellows 191 and 194 operate a slider 197 with respect to a potentiometer resistance element 198 against the action of a spring 199.

The right end of the potentiometer resistance element is connected to the terminal B on the proportioning motor 168 and the left end is connected through a resistance element 206 and a slider 203 of a manual rheostat generally designated at 202 to the terminal W of the proportioning motor 168. The slider 197 is connected directly to the terminal R. The differential temperature controller 190 is so arranged that normally the slider 197 is in the extreme right hand position as shown in Figure 2 to maintain the valve 146 in a wide open position. If the temperature differential between the outside temperature and the temperature of the circulating fluid should decrease the slider 197 is moved toward the left with respect to the potentiometer resistance element 198 to move the valve 146 towards a closed position which throttles the flow of circulating fluid to the coil 148. The throttling of this flow of the circulating fluid causes the evaporator 136 in the heat exchanger 137 to decrease the temperature of the circulating fluid going to the coil 148 whereupon the temperature differential is again widened and the coil 148 absorbs the desired amount of heat from the outside atmosphere. It is seen therefore that the differential controller 190 prevents the possibility of the evaporator 136 in the heat exchanger 137 from giving up heat to the outdoor coil 148 if the outdoor temperature should fall to a low value. The variable rheostat 202 is utilized for preventing complete closure of the valve 146 so that some fluid will at all times circulate through the coil 148. By reason of this arrangement the picking up of heat by the coil 148 is at all times assured.

The three-way mixing valve 154 is controlled by means of a temperature responsive controller generally designated at 212. This controller may comprise a bellows 213 connected by a capillary tube 214 to a bulb 215 responsive to the temperature of the circulating fluid leaving the cooling jacket of the internal combustion engine 61. The bellows 213 operates a lever 216 against the action of a tension spring 217 to move a slider 218 across a potentiometer resistance element 219. Upon a decrease in temperature of the circulating fluid leaving the cooling jacket the slider 218 is moved towards the right to operate the proportioning motor 160 to move the valve heads 155 and 156 upwardly. This throttles the flow of circulating fluid through the cooling jacket and thereby raises the temperature of the fluid leaving the cooling jacket. Conversely, upon an increase in temperature the slider 218 moves to the left to operate the proportioning motor 160 in the opposite direction which moves the valve heads 155 and 156 downwardly to increase the flow of circulating fluid to the cooling jacket. In this manner the three-way mixing valve is controlled to maintain the circulating fluid discharged from the cooling jacket at a substantially constant value whereby the temperature of the internal combustion engine is maintained at a value which gives most efficient operation.

From the above it is seen that in this modification a binary refrigerating system is utilized for absorbing heat from the outside atmosphere and liberating this heat in the space to be heated. The operation of the refrigerating system is controlled by a suction pressure controller which is reset by outside temperatures to maintain desired temperatures in the space 12, to cause the system to operate in an extremely efficient manner and to maintain a substantially constant temperature differential between outside temperatures and the temperature of the outdoor coil so that the system will always pick up heat from the outside. If for any reason this temperature differential is not maintained the temperature differential controller 190 steps in to throttle the flow of circulating fluid through the coil 148 and hence insure that at least a predetermined differential is maintained and that the system shall always absorb heat from the outside atmosphere. A control is also provided for maintaining the internal combustion engine 61 at a desired temperature for most efficient operation.

Referring now to the modification shown by Figure 3 the same building and space and the same heating chamber therefor are utilized as in Figures 1 and 2 and therefore like reference characters have been used. In Figure 3 the main heating coil or condenser 14 is connected by a high pressure pipe 224 to the high pressure side of a compressor 225 and is connected by a pipe 226 to a receiver 227. The receiver 227 is in turn connected through a pipe 28 and an expansion valve 229 to a coil 230 forming an evaporator for picking up heat from the outside atmosphere. The evaporator 230 is in turn connected by a pipe 231 to the low pressure or suction side of the compressor 225. When the compressor is operated refrigerant at high pressure is delivered to the condenser 14 wherein it is condensed liberating heat and is then collected in the receiver 227. From the receiver 227 the liquid refrigerant flows through the expansion valve 229 into the outside coil 230 where it is evaporated absorbing heat. The evaporated refrigerant is withdrawn from the outside coil or evaporator 230 by the compressor 225.

The compressor 225 is driven through a belt 58 and a shaft 60 by an internal combustion engine 61 and this internal combustion engine 61 includes the same mechanism for controlling the speed thereof and the same starting mechanism as is utilized in Figures 1 and 2 and hence like reference characters have been utilized.

The proportioning motor 69 which controls the speed of operation of the internal combustion engine 61 and hence the compressor 225 is controlled by a suction pressure controller generally designated at 235. This suction pressure controller may comprise a bellows 236 connected by a pipe 237 to the suction line 231 for operating a lever 238 against the action of a tension spring 239. The lever 238 operates a slider 240 with respect to a potentiometer resistance element 241 and a slider 242 with respect to a center tapped resistance element 243. Upon an increase in suction pressure the sliders 240 and 242 are rotated in a counter-clockwise direction and upon a decrease in suction pressure they are rotated in a clockwise direction.

The effective setting of the suction pressure controller 235 is controlled by an outdoor compensator generally designated at 245. This compensator may include a bellows 246 connected by a capillary tube 247 to a bulb 248 responsive to variations in outside temperature. The bellows 246 operates a lever 249 against the action of a tension spring 250 which in turn operates a slider 251 with respect to a potentiometer resistance element 252. Upon an increase in outdoor temperature the slider 251 is moved to the left and upon a decrease in outside temperature the slider is moved to the right.

A high pressure cut-out, generally designated at 255, is utilized for stopping the internal combustion engine in case the high pressure increases to an unsafe value and for placing the internal combustion engine under the control of the suction pressure controller and the outdoor compensator when the high pressure conditions are normal. This high pressure controller 255 may comprise a bellows 256 connected by a pipe 257 to the high pressure line 224. The bellows 256 operates a lever 258 against the action of a tension spring 259 which in turn operates a mercury switch 260 having outer electrodes 261 and 262 and inner electrodes 263. When the high pressure is normal the switch 260 is in the position shown in Figure 3 so that the mercury therein bridges the electrodes 262 and 263. In case the high pressure should increase to an abnormally high value then the mercury switch 260 is operated to cause the mercury to bridge electrodes 261 and 263.

The terminal W of the proportioning motor 69 is connected to the electrode 261 of the high pressure cut-out, to the right end of the resistance element 241 of the suction pressure controller 235 and to the left end of the resistance element 252 of the compensator 245. The terminal B of the proportioning motor 69 is connected to the left end of the resistance element 241 and to the right end of resistance element 252. The terminal R is connected to the inner electrodes 263 of the high pressure cut-out. The outer electrode 263 of the high pressure cut-out is connected to the slider 240 of the suction pressure controller 235 through the center tapped resistance 243 and the slider 242 and to the slider 251 of the outdoor temperature compensator through a variable resistance 264.

With the parts in the position shown in Figure 3 the terminal R of the proportioning motor is connected to the sliders of controller 235 and compensator 245 and accordingly upon an increase in suction pressure the slider 240 of the suction pressure controller 235 is moved toward the left to operate the proportioning motor 69 in such a direction as to open the throttle valve 65 to increase the speed of the internal combustion engine 61 and hence the compressor 225. Upon a decrease in suction pressure the slider 240 of the suction pressure controller 235 is moved to the right to operate the proportioning motor 69 in the opposite direction to close the throttle valve 65 and decrease the speed of the combustion engine 61. Accordingly the speed of the internal combustion engine 61 is controlled in direct accordance with the suction pressure of the refrigerating system. Upon an increase in outdoor temperature the slider 251 of the compensator 245 is moved to the left to operate the proportioning motor 69 in a direction to close the throttle valve 65 to decrease the speed of the engine 61. Upon a decrease in outdoor temperature the slider 251 is moved to the right to operate the proportioning motor 69 in the opposite direction to open the valve 65 and increase the speed of the internal combustion engine 61. In effect the outdoor compensator 245 adjusts the control point of the suction pressure controller 235 to lower the setting thereof as the outside temperature decreases causing the internal combustion engine to operate at a faster speed. Conversely, as the outside temperature increases the effective setting of the suction pressure controller 235 is raised which causes the combustion engine 61 to operate at a lower speed. If the high pressure of the refrigerating apparatus should become abnormally high the electrodes 261 and 263 of the high pressure cut-out are bridged to form an external shunt across the terminals R and W and to break the connection between the terminal R and the sliders 240 and 251 of the controller 235 and the compensator 245, respectively. This causes the proportioning motor 69 to move to an extreme position to close the throttle valve 65 and to open the ignition switch 71 whereby the internal combustion engine 61 is stopped.

Accordingly in Figure 3 the speed of the compressor 225 is controlled by suction pressure to maintain a desired suction pressure and this suction pressure is adjusted in accordance with variations in outside temperature to maintain desired temperatures within the space 12, to operate the system under most efficient conditions and to maintain a substantially constant temperature differential between the outside temperature and the temperature of the outside coil 230. In case of the occurrence of dangerous pressures on the high pressure side of the refrigerating apparatus the compressor 225 is stopped.

The flow of refrigerant to the outside coil 230 is controlled by an expansion valve 229 which is adjusted through a valve stem 267, a pitman 268 and a crank 269 operated by a proportioning motor 270. A proportioning motor 270 is controlled by a differential controller generally designated at 271, this controller acting as a constant superheat controller for the evaporator or outside coil 230. This controller may comprise a bellows 272 connected by a pipe 273 to the low pressure side of the evaporator 230 and a bellows 274 connected by a capillary tube 275 to a bulb 276 containing a volatile fluid and responsive to the temperature of the refrigerant leaving the evaporator 230. The two bellows 272 and 274 operate a slider 277 with respect to a potentiometer resistance 278 and a center tapped resistance element 279. The terminals B and W of the proportioning motor 270 are connected to the ends of the potentiometer resistance element 278 and the terminal R is connected to the slider 277 through the center tapped resistance element 279. Upon an increase in superheat of the gaseous refrigerant leaving the evaporator 230 the slider 277 is moved toward the left to cause the proportioning motor 270 to operate in the direction to open the expansion valve 229 whereupon more refrigerant is delivered to the evaporator 230 to reduce the superheat. Conversely, upon a decrease in superheat the slider 277 is moved to the right to cause the proportioning motor 270 to operate in the opposite direction to close the valve 229 to decrease the supply of refrigerant to the evaporator 230. Accordingly the controller 271 operates to position the expansion valve 229 to maintain a substantially constant value of superheat of the gaseous refrigerant leaving the evaporator 230.

This superheat controller 271 is in turn compensated by a room temperature responsive compensator generally designated at 281. This compensator may comprise a bellows 282 containing a volatile fluid for operating a lever 283 against the action of a tension spring 284 which in turn operates a slider 285 with respect to a potentiometer resistance element 286. Upon an increase in space temperature the slider 285 is moved towards the left and upon a decrease in temperature the slider is moved toward the right. The ends of the resistance element 286 are connected to the terminals B and W of the proportioning motor 70 and the slider 285 is connected to a variable resistance 287 to the terminal R of the proportioning motor 270.

Upon an increase in space temperature slider 285 moves to the left to cause the potentiometer 270 to operate in a direction to close the expansion valve 299 and hence decrease the flow of refrigerant to the evaporator 230. By decreasing the flow of refrigerant to the evaporator 230 the amount of heat picked up thereby is decreased and the suction pressure is decreased to slow down the speed of the compressor 225 with consequent decrease in the delivery of heat to the space 12. Conversely, upon a decrease in space temperature the slider 285 is moved toward the right to cause the proportioning motor to operate in the opposite direction to open the expansion valve 229 whereupon more refrigerant is delivered to the evaporator 230. This additional supply of refrigerant to evaporator 230 causes more heat to be picked up thereby and increases the suction pressure to cause the compressor to operate at a faster speed whereupon more heat is delivered to the space 12. In effect the room temperature responsive compensator 281 adjusts the setting of the superheat controller 271 to increase the supply of refrigerant to the evaporator 230 as the space temperature decreases and to decrease the supply of refrigerant to the evaporator 230 as the space temperature increases. In other words the superheat controller 271 and the space temperature responsive compensator 281 act as a limit control to maintain the space temperature at desired values in case the suction pressure controller 235 and the outdoor compensator 245 do not do so.

Provision is also made in this modification for utilizing the waste heat of the gases of combustion and the internal combustion engine for heating the space 12. This is accomplished by means of a boiler 290 receiving refrigerant from the receiver 227 through a pipe 291 under the control of a valve 292 which in turn is controlled by a float 293. The float 293 maintains the level of the refrigerant in the boiler 290 at a substantially constant value. The liquid refrigerant in the boiler 290 is evaporated and passes through a pipe 294, a pump 295 operated by a motor 296 and pipes 297 and 224 to the main heating coil or condenser 14. The refrigerant in the boiler 290 is heated and evaporated by a heating coil 298, this coil being connected by pipe 299 to the cooling jacket of the internal combustion engine 61. The cooling jacket is also connected by a pipe 300 to the exhaust gas heat exchanger 77. The exhaust gas heat exchanger 77 is in turn connected by a pipe 301, a pump 302 operated by a motor 303 and a pipe 304 to the heating coil 298. The heating medium of the heating coil 298 circulates therefrom through pipe 299, the cooling jacket of the internal combustion engine 61 wherein it picks up heat, pipe 300 through the exhaust gas heat exchanger 77 where it again picks up heat, pipe 301, pump 302 and pipe 304 back to the heating coil 298 wherein the heat absorbed is liberated to the refrigerant in the boiler 290 to heat and evaporate the same.

Although for purposes of illustration various forms of this invention have been disclosed, other forms thereof may become apparent to those skilled in the art upon reference to this specification and therefore this invention is to be limited only by the scope of the appended claims and prior art.

I claim as my invention:

1. In combination, an evaporator, a compressor, a condenser, a circulating fluid for absorbing heat at the evaporator and liberating the heat at the condenser, a heat engine for operating the compressor, means for collecting the waste heat of the heat engine, means for applying the waste heat so collected to the liquid circulating fluid on the discharge side of the condenser to gasify at least a portion thereof, and means for supplying said gasified liquid to the condenser to increase the heating effect thereof.

2. In combination, a circulating system including a first heat exchanger for absorbing heat from a fluid in contact therewith, a second heat exchanger for liberating the heat absorbed by the first heat exchanger, and means for maintaining a substantially constant temperature differential between the temperature of the circulating system adjacent the first heat exchanger and the temperature of the contacting fluid to insure that the first heat exchanger will absorb heat from the contacting fluid.

3. In combination, a circulating system including a first heat exchanger for absorbing heat from a fluid in contact therewith, a second heat exchanger for liberating the heat absorbed by the first heat exchanger, and means for controlling the circulating system to maintain a substantially constant temperature differential between the temperature of the circulating system adjacent the first heat exchanger and temperature of the contacting fluid to insure that the first heat exchanger will absorb heat from the contacting fluid.

4. In combination, a circulating system including a first heat exchanger for absorbing heat from a fluid in contact therewith, a second heat exchanger for liberating the heat absorbed by the first heat exchanger, and means for controlling the rate of liberation of heat from the second heat exchanger to maintain a substantially constant temperature differential between the temperature of the circulating system adjacent the first heat exchanger and the temperature of the contacting fluid to insure that the first heat exchanger will absorb heat from the contacting fluid.

5. In a temperature regulating system for a space, a mechanical refrigerating apparatus for controlling the temperature of the space including an evaporator, a condenser and a compressor, means responsive to suction pressure of the mechanical refrigerating apparatus for controlling the rate of compression by the compressor, and means responsive to temperatures outside of the space for adjusting the control point of the suction pressure responsive means, whereby the temperature controlling effect of the refrigerating apparatus is varied in accordance with changes in temperature outside of the space.

6. In a reverse cycle heating system for a space, the combination of a circulating system including an evaporator for absorbing heat, a compressor and a condenser for liberating the absorbed heat to the space, means responsive to suction pressure of the system for controlling the rate of compression by the compressor, and temperature responsive means influenced in accordance with the heating load for adjusting the control point of the suction pressure responsive means.

7. In a reverse cycle heating system for a space, the combination of a circulating system having an evaporator for absorbing heat from outside of the space, a compressor and a condenser for liberating the absorbed heat to the space, means responsive to space temperature for placing the compressor in operation, and means for controlling the rate of compression of the compressor after it has been placed in operation to maintain the rate of heat absorption by the evaporator substantially constant.

8. In a reverse cycle heating system for a space, the combination of a circulating system having an evaporator for absorbing heat from outside of the space, a compressor and a condenser for liberating the absorbed heat to the space, means for maintaining a desired temperature in the space including means responsive to suction pressure of the system and outside temperature for controlling the compressor, and means for insuring that heat will be absorbed by the evaporator.

9. In a reverse cycle heating system for a space, the combination of a circulating system having an evaporator for absorbing heat from outside of the space, a compressor and a condenser for liberating the absorbed heat to the space, means responsive to suction pressure of the system and outside temperature for controlling the compressor, and an expansion valve for the evaporator controlled by variations in space temperature.

10. In a reverse cycle heating system for a space, the combination of a circulating system having an evaporator for absorbing heat from outside of the space, a compressor and a condenser for liberating the absorbed heat to the space for heating the space, a heat engine for operating the compressor, means for collecting waste heat from the heat engine and liberating the waste heat to the space for additionally heating the space, means responsive to a condition indicative of the heating load of the space for controlling the operation of the heat engine and hence the compressor, means influenced in accordance with the temperature differential between evaporator temperature and outside temperature, and means controlled by said last named means controlling the system in a manner to maintain the evaporator temperature lower than outside temperature.

11. In a reverse cycle heating system for a building, a first refrigeration system, a second refrigeration system, each of said refrigeration systems including an evaporator for absorbing heat and a condenser for liberating heat, means utilizing the condenser of one of said systems for supplying heat to the space being heated, means including the condenser of the other refrigeration system for supplying heat to the evaporator of said one of said systems for increasing the heating effect of the condenser of said one of said systems, a heat exchanger associated with the evaporator of the other of said systems, said heat exchanger being in communication with a heat absorbing coil located exteriorly of the building, and means for circulating a heat transfer medium through said heat exchanger and said heat absorbing coil.

12. In a reverse cycle heating system for a building, a first refrigeration system, a second refrigeration system, each of said refrigeration systems including an evaporator for absorbing heat and a condenser for liberating heat, means utilizing the condenser of one of said systems for supplying heat to the space being heated, means including the condenser of the other refrigeration system for supplying heat to the evaporator of said one of said systems for increasing the heating effect of the condenser of said one of said systems, a heat exchanger associated with the evaporator of the other of said systems, said heat exchanger being in communication with a heat absorbing coil located exteriorly of the building, means for circulating a heat transfer medium through said heat exchanger and said heat absorbing coil, and means for controlling said refrigeration systems to insure that the heat transfer medium passing to said heat absorbing coil located exteriorly of said building is at a lower temperature than the medium surrounding said heat absorbing coil.

13. In a reverse cycle heating system for heating a space, in combination, a condenser in heat exchange relationship with the space for heating the space, an evaporator for absorbing heat from outside of the space, a compressor for circulating refrigerant through said condenser and evaporator, a prime mover for driving said compressor, said prime mover being of a type giving off heat, means for transferring heat from the prime mover to liquid refrigerant discharged from the condenser, and means independent of said evaporator for returning the refrigerant evaporated by said prime mover heat to the condenser.

14. In a reverse cycle heating system for heating a space, in combination, a condenser in heat exchange relationship with the space for heating the space, an evaporator for absorbing heat from outside of the space, a compressor for circulating refrigerant through said condenser and evaporator, a prime mover for driving said compressor, said prime mover being of a type giving off heat, and means for transferring said prime mover heat to said refrigerant at a point where the heated refrigerant may pass to the condenser without passing through the evaporator.

15. In a reverse cycle heating system for heating a space, the combination of, a circulating system having a first heat exchanger for absorbing heat from outside of the space and a second heat exchanger for liberating the heat absorbed to the space, thermostatic means influenced in accordance with the temperature of the medium surrounding the first heat exchanger, thermostatic means influenced in accordance with the temperature of said first heat exchanger, and means controlled conjointly by said thermostatic means for maintaining the temperature of said first heat exchanger lower than the temperature of the medium surrounding said first heat exchanger.

16. In a reverse cycle heating system for heating a space, in combination, a first heat exchanger in heat exchange relationship with the space for heating the space, a second heat exchanger in heat exchange relationship with a medium outside of said space for absorbing heat from said medium, means including compressing means for causing heat absorbed by said second heat exchanger to be raised in temperature and delivered to said first heat exchanger, and means influenced by the differential in temperature between the second heat exchanger and the temperature of said medium for controlling said compressing means.

17. In a reverse cycle heating system in combination, a condenser in heat exchange relationship with the space, an evaporator, a heat exchanger arranged so as to absorb heat from a medium outside of the space, a circulating system for circulating a fluid between the evaporator and the heat exchanger, means including compressing means for transferring heat from said evaporator to said condenser, and means influenced by the temperature differential between said medium and said fluid for controlling said compressing means.

18. In a reverse cycle heating system in combination, a condenser in heat exchange relationship with the space, an evaporator, a heat exchanger arranged so as to absorb heat from a medium outside of the space, a circulating system for circulating a fluid between the evaporator and the heat exchanger, means including compressing means for transferring heat from said evaporator to said condenser, and means influenced by the temperature differential between said medium and said fluid for controlling the circulation of said fluid.

19. A heating system for a building comprising, in combination, a condenser in heat exchange relation with the interior of the building for heating the building, an evaporator in heat exchange relationship with a heat supplying medium, means including variable capacity compressing means for causing flow of heat from said evaporator to said condenser, a thermostat response to the temperature of the building for placing said compressing means into and out of operation, and thermostatic means influenced by the temperature of the atmosphere outside of said building for graduatingly controlling the capacity of said compressing means.

20. A heating system for a building comprising, in combination, a condenser in heat exchange relation with the interior of the building for heating the building, an evaporator in heat exchange relationship with a heat supplying medium, means including variable capacity compressing means for causing flow of heat from said evaporator to said condenser, and thermostatic means influenced by outside temperature for controlling the compressor capacity in a manner to lower the evaporator temperature maintained upon fall in outside temperature.

21. A heating system for a building comprising, in combination, a condenser in heat exchange relation with the interior of the building for heating the building, an evaporator in heat exchange relationship with a heat supplying medium, means including variable capacity compressing means for causing flow of heat from said evaporator to said condenser, thermostatic means influenced by outside temperature for controlling the compressor capacity in a manner to lower the evaporator temperature maintained upon fall in outside temperature, and thermostatic means influenced by the demand for heat in the building for controlling the flow of refrigerant into said evaporator.

WILLIAM L. McGRATH.